(12) United States Patent
Oda

(10) Patent No.: US 6,393,301 B1
(45) Date of Patent: May 21, 2002

(54) RADIO TELEPHONE SYSTEM WITHIN A VEHICLE WITH ENHANCED SAFETY FEATURES

(75) Inventor: Toshiaki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/203,588

(22) Filed: Dec. 2, 1998

(30) Foreign Application Priority Data

Dec. 3, 1997 (JP) .............................................. 9-332983

(51) Int. Cl.[7] ................................................ H04B 1/38
(52) U.S. Cl. ...................... 455/557; 455/345; 455/351; 455/575; 455/413; 455/417; 455/426
(58) Field of Search .................................. 455/412, 413, 455/414, 417, 426, 462, 464, 517, 550, 575, 345, 346, 567, 557, 11.1, 351

(56) References Cited

U.S. PATENT DOCUMENTS

| | | | |
|---|---|---|---|
| 4,974,250 A | * 11/1990 | Tomiyori | 455/557 |
| 5,367,558 A | 11/1994 | Gillig et al. | 455/464 X |
| 5,493,703 A | * 2/1996 | Yamashita | 455/351 X |
| 5,636,265 A | 6/1997 | O'Connell et al. | 455/412 |
| 5,797,088 A | * 8/1998 | Stamegna | 455/345 |
| 5,867,794 A | * 2/1999 | Hayes et al. | 455/557 |
| 6,044,262 A | 3/2000 | Hirayama | 455/412 |

FOREIGN PATENT DOCUMENTS

| | | |
|---|---|---|
| JP | 4-192949 | 7/1992 |
| JP | 4-216221 | 8/1992 |
| JP | 4-287740 | 10/1992 |
| JP | 7-115680 | 5/1995 |
| JP | 10-200961 | 7/1998 |
| JP | 10-248081 | 9/1998 |
| JP | 10-276126 | 10/1998 |
| JP | 10-313479 | 11/1998 |

OTHER PUBLICATIONS

Japanese Office Action dated Nov. 2, 1999, with partial translation.

* cited by examiner

Primary Examiner—William Trost
Assistant Examiner—Philip J. Sobutka
(74) Attorney, Agent, or Firm—McGinn & Gibb, PLLC

(57) ABSTRACT

A radio telephone system for use in a vehicle is composed of an accessory mounted in the vehicle and a radio telephone that is separated from the accessory. The accessory transmits a mode switch signal indicating an operation state of the vehicle to the radio telephone by wireless means such as radio or infrared. When receiving the mode switch signal from the accessory, the radio telephone changes its operation mode depending on the mode switch signal. The operation state of the vehicle is an on/off state of an ignition key or a speed of the vehicle.

37 Claims, 6 Drawing Sheets

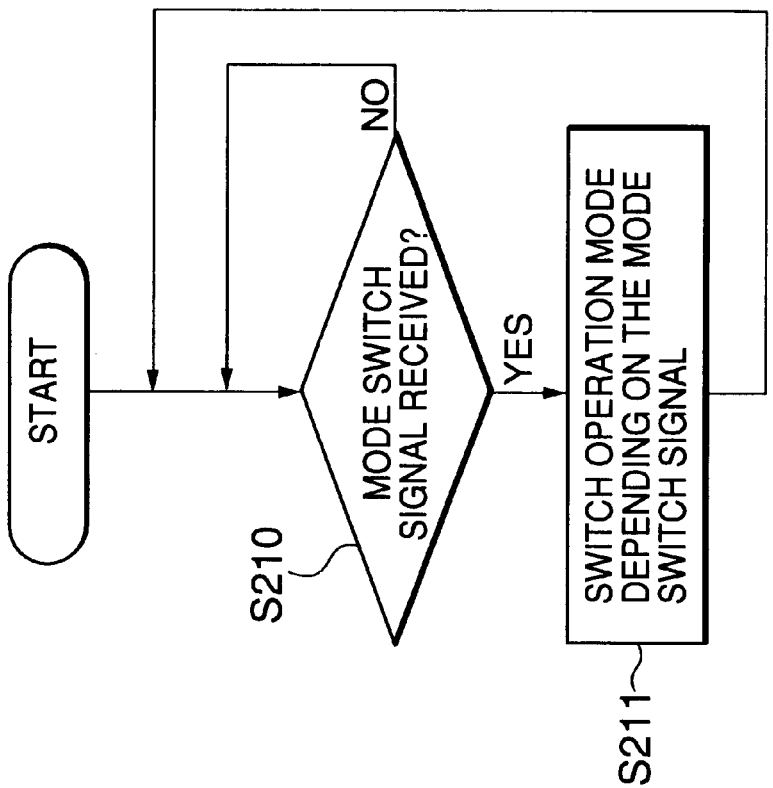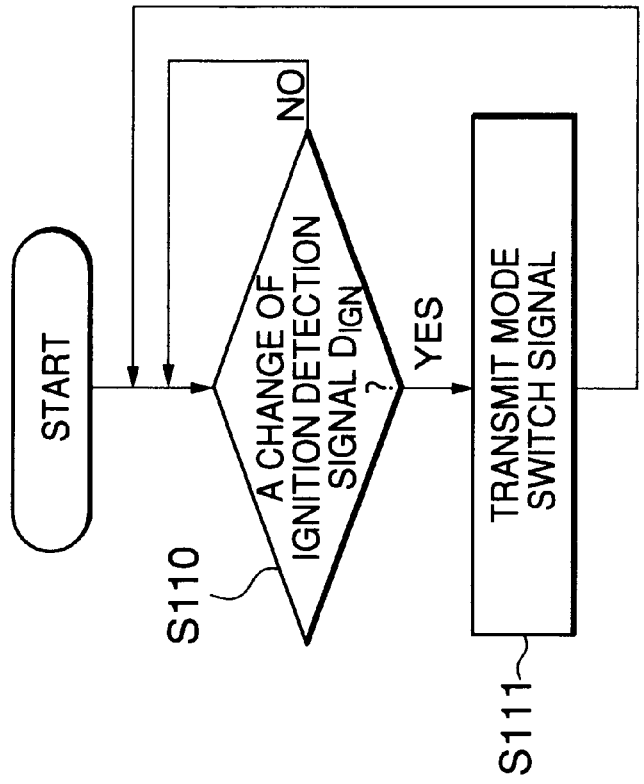

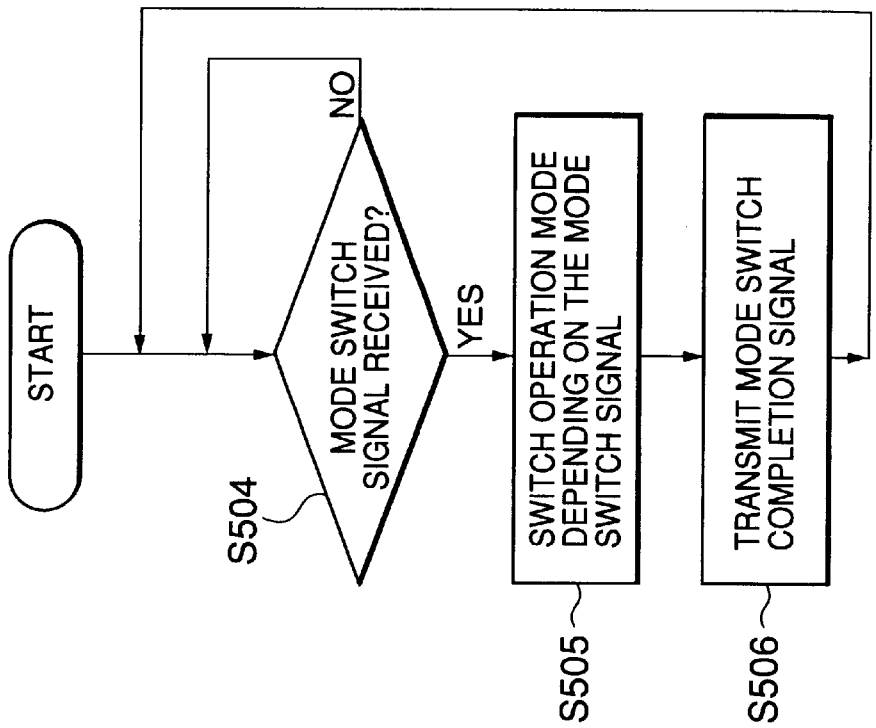
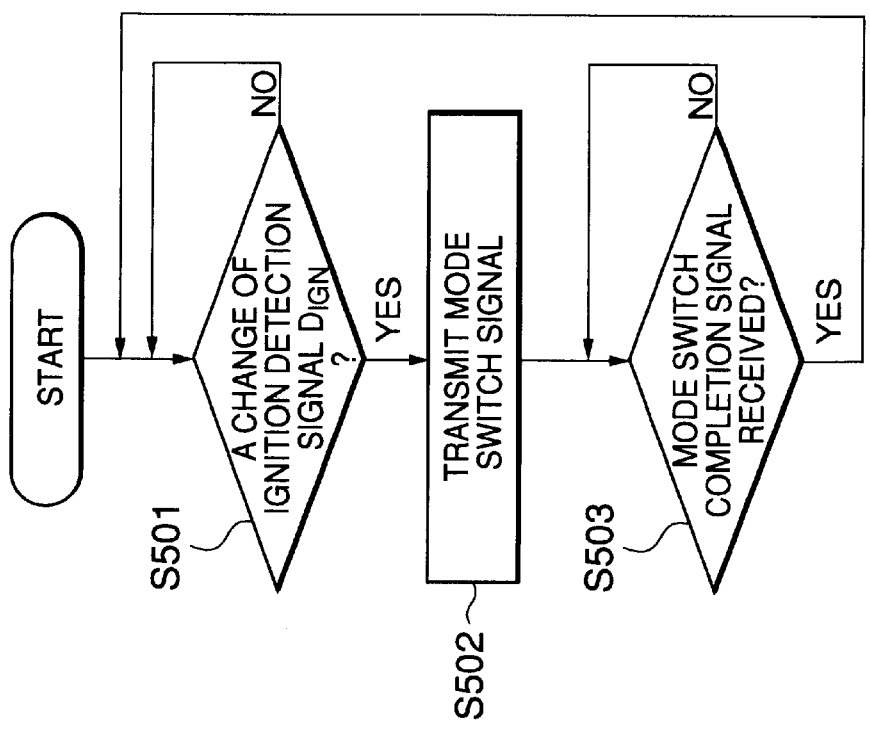

RADIO TELEPHONE SYSTEM WITHIN A VEHICLE WITH ENHANCED SAFETY FEATURES

BACKGROUND OF THE INVENTION

1. Field of the Invention

The present invention generally relates to a radio telephone system within a vehicle, and in particular to a radio telephone system that can change the operation mode of a radio telephone terminal.

2. Description of the Related Art

A car-mounted telephone system having a function of switching its operation mode between a driving mode and a stop mode has been disclosed in Japanese Patent Unexamined Publication No. 4-192949. This conventional telephone system is provided with an ignition key detector and a phone-answering/recording machine. The phone-answering/recording machine is automatically activated or inactivated depending on a detection result of the ignition key detector. For example, when an ignition key is turned on, the telephone system is set to a normal mode where communication is made available. When the ignition key is turned off, the telephone system is automatically set to a phone-answering/recording mode.

As another conventional example, an in-car adapter for mobile telephone has been disclosed in Japanese Patent Unexamined Publication No. 4-287740. This system can ensure the continuity of conversation even if the ignition key is turned off during conversation.

According to the above telephone systems, however, the telephone handset is mounted in the car or the mobile telephone is directly connected to the adapter mounted in the car. Therefore, the convenience of portability in a mobile telephone terminal is extremely reduced.

Further, the use of mobile telephone while driving a car frequently causes a traffic accident. To prevent such a traffic accident, a hands-free telephone set has been commercially available. Various measures against traffic accidents caused by the use of mobile telephone while driving a car are needed more and more.

SUMMARY OF THE INVENTION

An object of the present invention is to provide an in-car radio telephone system which can control the operation mode of a radio telephone terminal without reducing the convenience of portability of the radio telephone.

Another of the present invention is to provide a radio telephone system which can change the operation mode of a radio telephone depending on the operation state of a vehicle.

Still another of the present invention is to provide a radio telephone which can change in operation mode without reducing the convenience of portability thereof.

According to an aspect of the present invention, a radio telephone system for use in a vehicle is comprised of an accessory mounted in the vehicle and a radio telephone that is separated from the accessory. The accessory includes a detector for detecting an operation state of the vehicle and a wireless transmitter for transmitting a mode switch signal indicating the operation state to the radio telephone. The radio telephone includes a radio transceiver for telephone communication, a wireless receiver for receiving the mode switch signal from the accessory, and a controller for changing an operation mode of the radio telephone depending on the mode switch signal.

The detector may detect an on/off state of an ignition key of the vehicle. When the ignition key is in the on state, the wireless transmitter transmits the mode switch signal indicating a driving state and, when the ignition key is in the off state, and wireless transmitter transmits the mode switch signal indicating a stop state.

The detector may detect a speed of the vehicle. The speed of the vehicle is not lower than a predetermined speed, the wireless transmitter transmits the mode switch signal indicating a driving state and, when the speed of the vehicle is lower than the predetermined speed, the wireless transmitter transmits the mode switch signal indicating a stop state.

The controller may select one of two predetermined modes as the operation mode of the radio telephone depending on the mode switch signal. The two predetermined modes are selected from a communication mode that makes a normal telephone function active, a phone-answering mode that makes an automatic answering function active, and a suspending mode that makes both the normal telephone function and the automatic answering function inactive.

Further, the two predetermined modes consists of a first mode and a second mode, wherein the first mode is selected when the mode switch signal indicating the driving state is received, and the second mode is selected when the mode switch signal indicating the stop state is received. Preferably, the first mode is one selected from the phone-answering mode and the suspending mode.

According to another aspect of the present invention, the accessory includes a detector for detecting an operation state of the vehicle, a wireless transceiver for transmitting a mode switch signal indicating the operation state to the radio telephone and receiving a mode switch completion signal from the radio telephone, and an accessory controller determining whether the mode switch completion signal is received from the radio telephone after the mode switch signal has been transmitted to the radio telephone and stopping the wireless transceiver transmitting the mode switch signal unless the mode switch completion signal is received from the radio telephone. The radio telephone includes a radio transceiver for telephone communication, a wireless transceiver for receiving the more switch signal from the accessory and transmitting the mode switch completion signal to the accessory, and a radio telephone controller for changing an operation mode of the radio telephone depending on the mode switch signal before causing the wireless transceiver to transmit the mode switch completion signal to the accessory.

According to the present invention, a radio telephone is separated from an accessory mounted in a vehicle, wherein the accessory transmits a mode switch signal to the radio telephone when a change of an operation state of the vehicle is detected. The radio telephone includes a radio transceiver for telephone communication, a wireless receiver for receiving the mode switch signal from the accessory, and a controller for changing an operation mode of the radio telephone depending on the mode switch signal.

BRIEF DESCRIPTION OF THE DRAWINGS

FIG. 2A is a flow chart showing the operation of an in-car accessory according to the first embodiment;

FIG. 2B is a flow chart showing the operation of a mobile telephone set according to the first embodiment;

FIG. 5A is a flow chart showing the operation of an in-car accessory according to the third embodiment;

FIG. 5B is a flow chart showing the operation of a mobile telephone set according to the third embodiment.

DETAILED DESCRIPTION OF THE PREFERRED EMBODIMENTS

FIRST EMBODIMENT

Figure 1:
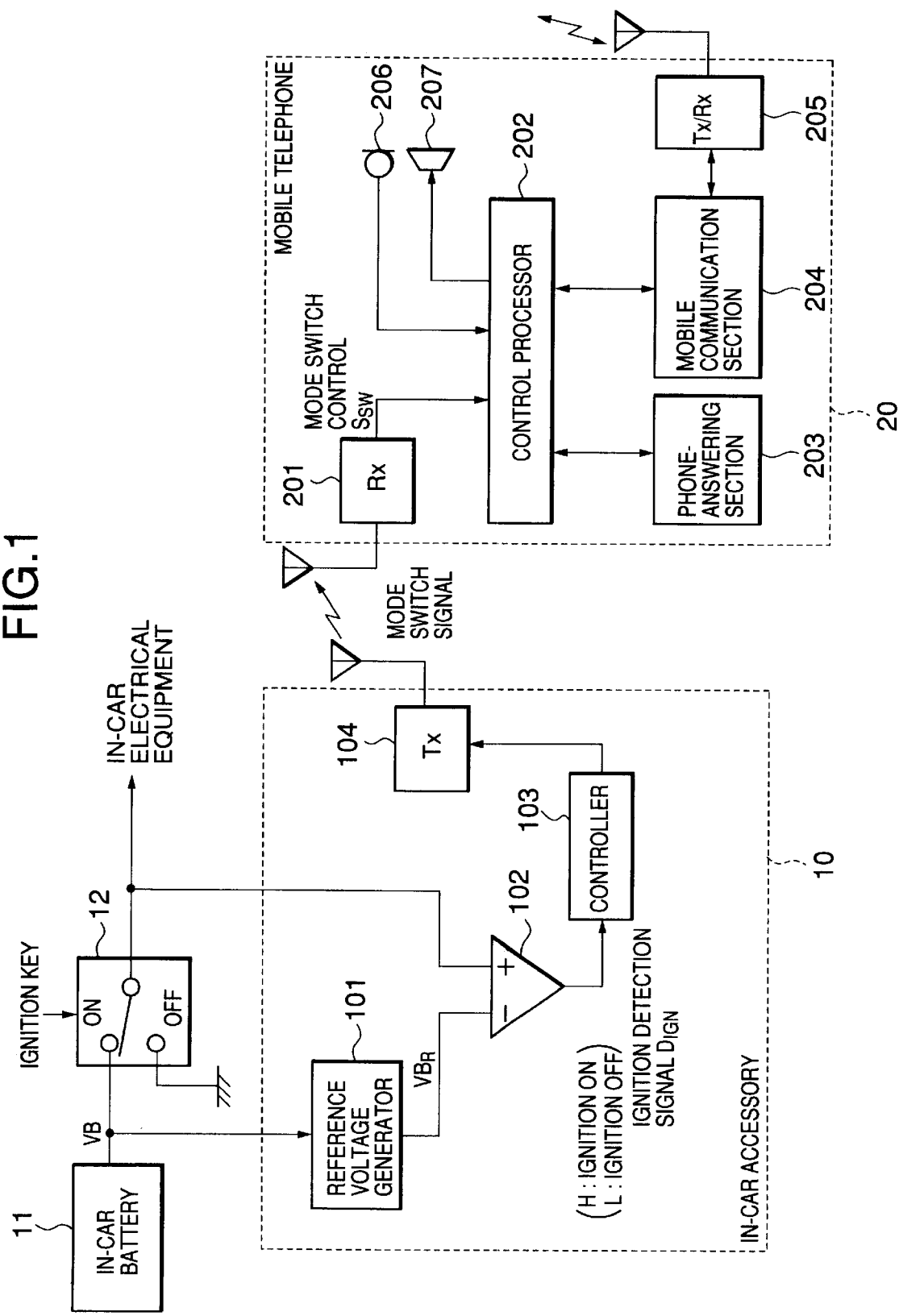
FIG. 1 is a block diagram showing an in-car mobile telephone system according to a first embodiment of the present invention.

Referring to FIG. 1, an in-car radio telephone system is composed of an in-car accessory 10 and a mobile telephone 20 which are separately provided within a car but are capable of being connected from the in-car accessory 10 to the mobile telephone 20 by weak radio.

The in-car accessory 10 is electrically connected to an in-car battery 11 and an ignition switch 12. The ignition switch 12 has an ON contact connected to the in-car battery 11 and an OFF contact connected to in-car electrical equipment. Therefore, the in-car battery 11 supplies power to in-car electrical equipment through the ignition switch 12 when a driver turns the ignition key on.

The in-car accessory 10 includes an ignition detector composed of a reference voltage generator 101 and a voltage comparator 102. The reference voltage generator 101 generates a reference voltage $VB_R$ from the battery voltage VB of the in-car battery 11. The reference voltage $VB_R$ is lower than the battery voltage VB. The voltage comparator 102 compares an output voltage of the ignition switch 12 to the reference voltage $VB_r$. The output voltage of the ignition switch 12 switches between the battery voltage VB and the ground voltage level depending on the on/off state of the ignition switch 12. Therefore, the voltage comparator 102 produces a detection signal $D_{IGN}$ rises to a high-voltage level when the ignition switch 12 is turned on and falls to a low-voltage level when the ignition switch 12 is turned off.

A controller 103 controls a radio transmitter 104 according to the detection signal $D_{IGN}$ received from the voltage comparator 102. More specifically, when the detection signal $D_{IGN}$ changes to a high-voltage level or a low-voltage level, the controller 103 controls the radio transmitter 104 such that a mode switch signal is transmitted at a predetermined radio frequency. Since it is enough to transmit the mode switch signal from the in-car accessory 10 to the mobile telephone 20 within the car, the transmission power of the radio transmitter 104 may be very small, resulting in negligible power consumption required for radio transmission.

The mobile telephone 20 includes a radio receiver 201 for receiving the mode switch signal from the in-car accessory 10. In addition to the radio receiver 201, the mobile telephone 20 includes a control processor 202, a phone-answering section 203, a mobile communication section 204, a transceiver 205, a microphone 206 and a speaker 207. The control processor 202 performs the well-known mobile telephone control using the mobile communication section 204 and the transceiver 205.

Further the control processor 202 performs the operation mode switching control depending on the mode switch control signal $S_{SW}$ received from the in-car accessory 10. The mobile telephone 20 may have a plurality of operation modes including communication mode, phone-answering mode, or suspending mode. The suspending mode is an operation mode where neither communication nor phone-answering is made.

A plurality of combinations of two operation modes may be considered in the present embodiment as shown in the following table. Among these possible combinations, the last four combinations marked with an asterisk are extremely preferably from the viewpoint of precluding the possibility of traffic accident occurrence because the driver does not have to handle the mobile telephone 20 while driving. One of these four operation modes can be set up in the control processor 202 by the driver operating a keypad (not shown in FIG. 1) of the mobile telephone 20.

TABLE

| Ignition ON (driving) | Ignition OFF (stop) |
|---|---|
| Communication mode | Suspending mode |
| Communication mode | Phone-answering mode |
| *Phone-answering mode | Communication mode |
| *Phone-answering mode | Suspending mode |
| *Suspending mode | Communication mode |
| *Suspending mode | Phone-answering mode |

Referring to FIG. 2A, the controller 103 monitors the detection signal $D_{IGN}$ received from the voltage comparator 102 at all times (step S110). When the detection signal $D_{IGN}$ changes to a high-voltage level or a low-voltage level (YES in step S110), the controller 103 controls the radio transmitter 104 such that the mode switch signal is transmitted to the mobile telephone 20 (step S111). More specifically, when the detection signal $D_{IGN}$ changes to the high-voltage level, it means that the ignition key is turned on to drive the car. Therefore, the mode switch signal indicating the driving operation is transmitted. On the other hand, when the detection signal $D_{IGN}$ changes to the low-voltage level, it means that the ignition key is turned off to stop the car operating. Therefore, the mode switch signal indicating the stop operation is transmitted.

Referring to FIG. 2B, the control processor 202 waits for the mode switch signal from the in-car accessory 10 (step S210). When receiving the mode switch signal, the control processor 202 performs the operation mode switching control depending on the mode switch control $S_{SW}$ (step S211).

Assuming that the phone-answering mode is set up in the case of driving operation and the communication mode is set up in the case of stop operation. When receiving the mode switch signal indicating the driving operation, the control processor 202 switches its operation mode from the communication mode to the phone-answering mode. Therefore, even when an incoming call occurs, the driver does not have to handle the mobile telephone 20. On the other hand, when receiving the mode switch signal indicating the stop operation, the control processor 202 switches its operation mode from the phone-answering mode to the communication mode. Therefore, when an incoming call occurs, the driver can make a phone conversation by pressing an off-hook key of the mobile telephone 20.

It should be noted that the transmitter 104 and the radio receiver 201 may be replaced with an infrared transmitter and an infrared receiver.

As described above, according to the first embodiment, by the driver switching the ignition key on/off, the mobile telephone 20 is automatically set to phone-answering/ communication mode. Therefore, the driver does not have to handle the mobile telephone 20 while driving, resulting in the reduced possibility of traffic accident occurrence. Since the mobile telephone 20 is not connected to the in-car accessory 10 by a cable or the like, the driver can take the mobile telephone 20 out of the car.

SECOND EMBODIMENT

Figure 3:
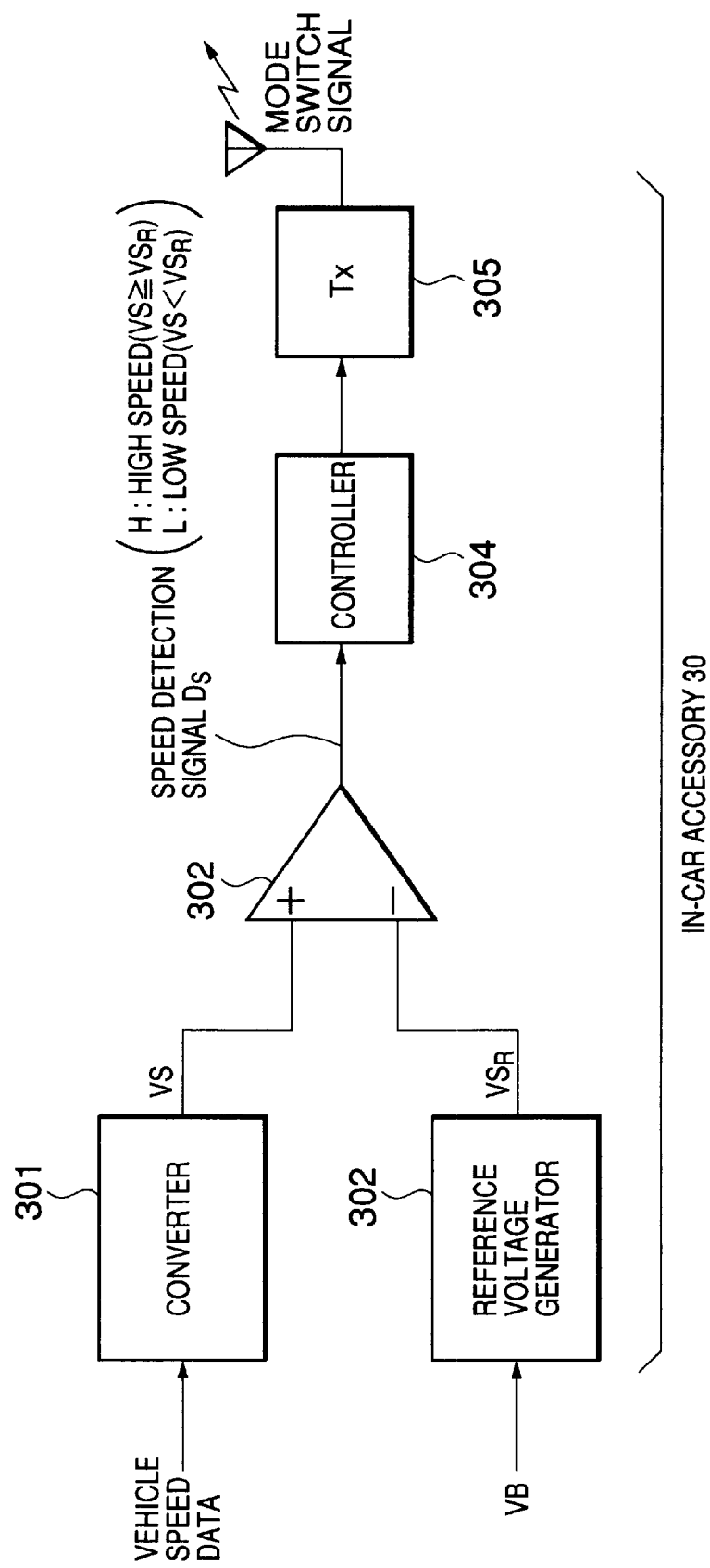
FIG. 3 is a block diagram showing an in-car accessory of a mobile telephone system according to a second embodiment of the present invention.

Referring to FIG. 3, there is shown an in-car accessory 30 which transmits the mode switch signal to the mobile telephone 20 based on the speed of the car.

The in-car accessory 30 includes a car speed detector composed of a converter 301, a reference voltage generator 302 and a comparator 303. The converter 301 receives car speed data from in-car equipment and produces a speed reflecting voltage VS varying according to the speed. The reference voltage generator 302 generates a predetermined reference voltage $VS_R$ from the battery voltage VB. The comparator 303 compares the speed reflecting voltage VS to the reference voltage $VS_R$. The comparator 303 produces a speed detection signal $D_S$ which changes in voltage depending on whether the speed reflecting voltage VS is lower than the reference voltage $VS_R$. More specifically, the speed detection signal $D_S$ changes to a high-voltage level when the speed reflecting voltage VS is equal to or greater than the reference voltage $VS_R$ and falls to a low-voltage level when the speed reflecting voltage VS is lower than the reference voltage $VS_R$.

A controller 304 controls a radio transmitter 305 according to the speed detection signal $D_S$ received from the comparator 303. More specifically, when the speed detection signal $D_S$ changes to a high-voltage level or a low-voltage level, the controller 304 controls the radio transmitter 305 such that a mode switch signal is transmitted at the predetermined radio frequency. In other words, when the speed detection signal $D_S$ changes to the high-voltage level, it means that the car runs at high speeds. Therefore, the mode switch signal indicating the driving operation is transmitted. On the other hand, when the speed detection signal $D_S$ changes to the low-voltage level, it means that the car runs at low speeds. Therefore, the mode switch signal indicating the stop operation is transmitted.

The mode switch operation of the mobile telephone 20 is the same as in the case of the first embodiment. Assuming that the phone-answering mode is set up in the case of driving operation and the communication mode is set up in the case of stop operation. When receiving the mode switch signal indicating the driving operation, the control processor 202 switches its operation mode from the communication mode to the phone-answering mode. Therefore, even when an incoming call occurs, the driver does not have to handle the mobile telephone 20. ON the other hand, when receiving the mode switch signal indicating the stop operation, the control processor 202 switches its operation mode from the phone-answering mode to the communication mode. Therefore, when an incoming call occurs, the driver can make a phone conversation by pressing an off-hook key of the mobile telephone 20.

As described above, according to the second embodiment, the mobile telephone 20 is automatically set to phone-answering/communication mode depending on the car speed. Therefore, the driver does not have to handle the mobile telephone 20 while running at high speeds, resulting in the reduced possibility of heavy traffic accident occurrence.

THIRD EMBODIMENT

Figure 4:
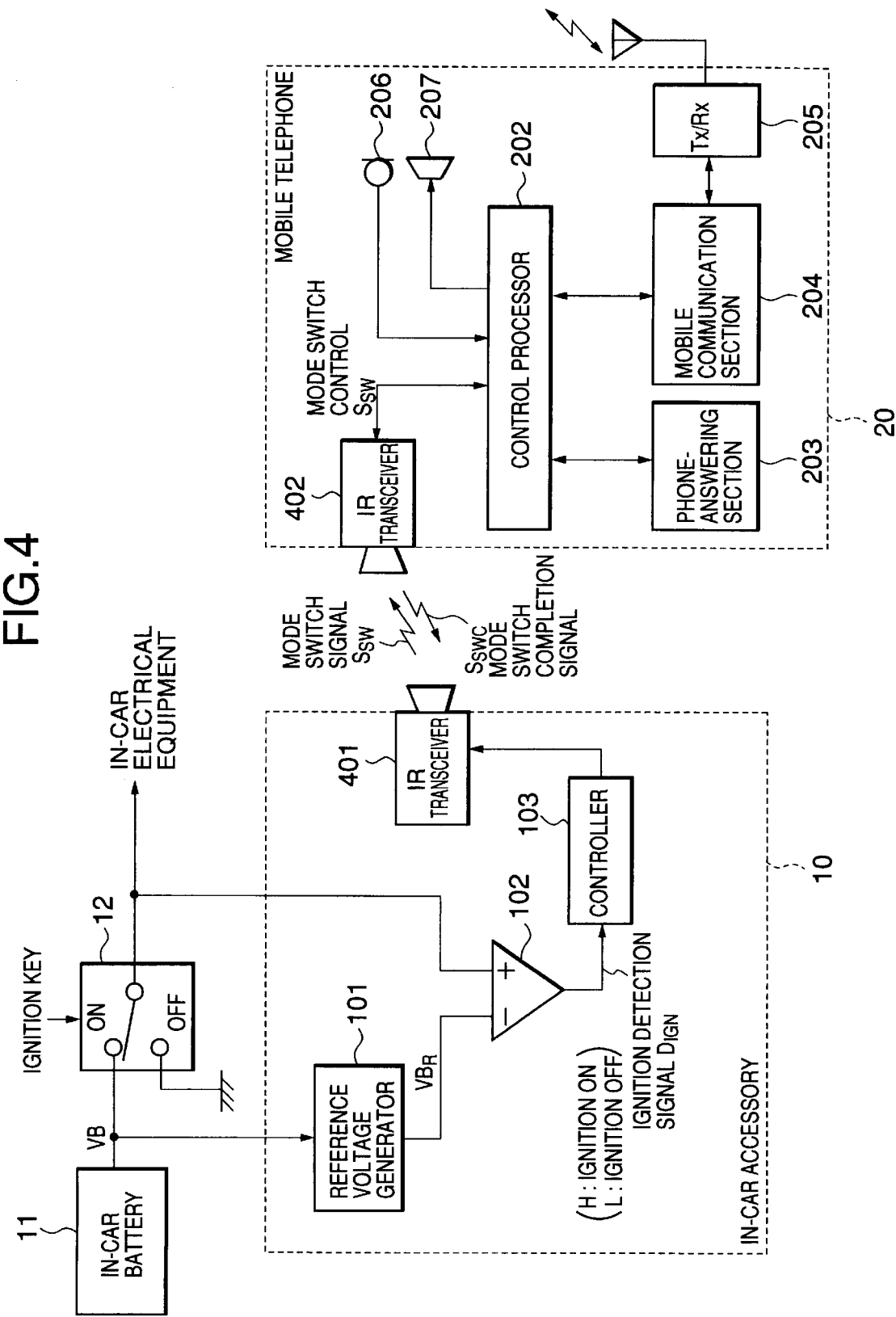
FIG. 4 is a block diagram showing an in-car mobile telephone system according to a third embodiment of the present invention.

Referring to FIG. 4, infrared transmitting and receiving means 401 and 402 may be used in place of the radio transmitter 104 and receiver 201 of FIG. 1. In the third embodiment, the in-car accessory 10 is provided with an infrared transceiver 401 and the mobile telephone 20 is provided with an infrared transceiver 401. The other circuit blocks similar to those previously described with reference to FIG. 1 are denoted by the same reference numerals and the descriptions are omitted. However, control operations of the controller 103 and the control processor 202 are different from those of FIGS. 2A and 2B. The control operations according to the third embodiment will be described hereinafter.

Referring to FIG. 5A, the controller 103 monitors the detection signal $D_{IGN}$ received from the voltage comparator 102 at all times (step S501). When the detection signal $D_{IGN}$ changes to a high-voltage level or a low-voltage level (YES in step S501), the controller 103 controls the infrared transceiver 401 such that the mode switch signal is transmitted to the mobile telephone 20 (step S502). More specifically, when the detection signal $D_{IGN}$ changes to the high-voltage level, it means that the ignition key is turned on to drive the car. Therefore, the mode switch signal indicating the driving operation is transmitted. On the other hand, when the detection signal $D_{IGN}$ changes to the low-voltage level, it means that the ignition key is turned off to stop the car operating. Therefore, the mode switch signal indicating the stop operation is transmitted.

After the mode switch signal has been transmitted, the controller 103 determines whether a mode switch completion signal is received from the mobile terminal 20 through the infrared transceiver 401 (step S503). In this embodiment, the control does not go back to the step (S501) unless the mode switch completion signal is received.

Referring to FIG. 5B, the control processor 202 waits for the mode switch signal from the in-car accessory 10 (step S504). When receiving the mode switch signal, the control processor 202 performs the operation mode switching control depending on the mode switch control $S_{SW}$ (step S505). Thereafter, the mode switch completion signal is transmitted to the in-car accessory 10 through the infrared transceiver 402 (step S506).

Assuming that the phone-answering mode is set up in the case of driving operation and the communication mode is set up in the case of stop operation. When receiving the mode switch signal indicating the driving operation, the control processor 202 switches its operation mode from the communication mode to the phone-answering mode. Therefore, even when an incoming call occurs, the driver does not have to handle the mobile telephone 20. On the other hand, when receiving the mode switch signal indicating the stop operation, the control processor 202 switches its operation mode from the phone-answering mode to the communication mode. Therefore, when an incoming call occurs, the driver can make a phone conversation by pressing an off-hook key of the mobile telephone 20.

As described above, according to the third embodiment, the in-car accessory 10 can confirm the operation switch completion of the mobile telephone 20 by receiving the mode switch completion signal. Therefore, the operation mode switch can be performed with reliability.

It should be noted that the infrared transceivers 401 and 402 may be replaced with radio transceivers or other wireless transceivers.

ANOTHER MOBILE TELEPHONE

Figure 6:
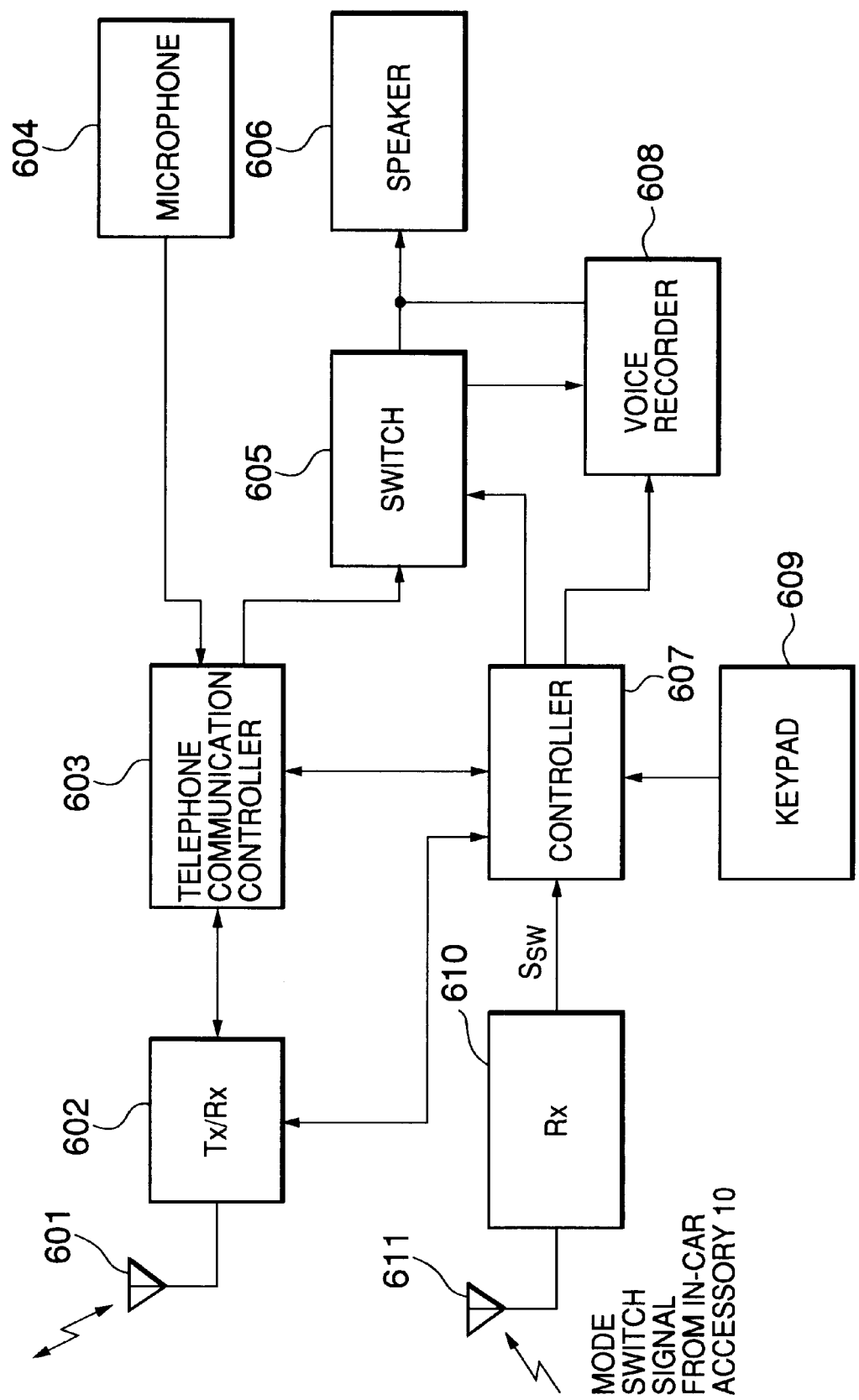
FIG. 6 is a block diagram showing an example of a mobile telephone set according to the present invention.

Referring to FIG. 6, there is shown a mobile telephone having phone-answering and recording function therein. The mobile telephone is provided with an antenna 601 for telephone communication and another antenna 611 for receiving a mode switch signal from the in-car accessory 10.

The antenna 601 is connected to a radio transceiver 602, which is in turn connected to a telephone communication controller 603 which performs channel control for telephone communication. A microphone 604 is connected to the telephone communication controller 603 to perform voice input. A speaker 606 is connected to the telephone communication controller 603 through a switch 605. The switch 605 is controlled by a controller 607 such that a received voice signal output from the telephone communication controller 603 is selectively transferred to the speaker 606 and a voice recorder 608. The controller 607 can be set to phone-answering and recording mode by a user operating a phone-answering mode key of a keypad 609. As described before, a radio receiver 610 connected to the antenna 611 outputs the mode switch control signal $S_{SW}$ to the controller 607.

Assuming that the phone-answering mode key has been pressed by the driver. When receiving the mode switch signal indicating the driving operation from the in-car accessory 10, the controller 607 controls the switch 605 such that the received voice signal is transferred to the voice recorder 608 and sets the voice recorder 608 to a recording-ready state. Therefore, when an incoming call occurs, the received voice signal is automatically recorded to the voice recorder 608 without a driver's instruction.

On the other hand, when receiving the mode switch signal indicating the stop operation, the controller 607 controls the switch 605 such that the received voice signal is transferred to the speaker 606 and sets the voice recorder 608 to an off state. Therefore, when an incoming call occurs, the driver can make a phone conversation by pressing an off-hook key of the mobile telephone 20. In the case where received messages have been stored in the voice recorder 608, the driver can hear the messages by pressing a play key of the keypad 609.

In the table as described before, the last four combinations marked with an asterisk are extremely preferable from the viewpoint of precluding the possibility of traffic accident occurrence because the driver does not have to handle the mobile telephone 20 while driving. A desired one of these four operation modes can be set up in the controller 607 by the driver operating the keypad 609.

What is claimed is:

1. A radio telephone system for use in a vehicle, comprising:
    an accessory mounted in the vehicle; and
    a radio telephone that is separated from the accessory, wherein the accessory comprises:
        a detector for detecting an operation state of the vehicle, and
        a wireless transmitter for transmitting a mode switch signal indicating the operation state to the radio telephone, and wherein the radio telephone comprises:
            a radio transceiver for telephone communication;
            a wireless receiver for receiving the mode switch signal from the accessory, and
            a controller for changing an operation mode of the radio telephone depending on the mode switch signal.

2. The radio telephone system according to claim 1, wherein the detector detects an on/off state of an ignition key of the vehicle.

3. The radio telephone system according to claim 2, wherein, when the ignition key is in the on state, the wireless transmitter transmits the mode switch signal indicating a driving state and, when the ignition key is in the off state, the wireless transmitter transmits the mode switch signal indicating a stop state.

4. The radio telephone system according to claim 3, wherein the controller selects one of two predetermined modes as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

5. The radio telephone system according to claim 4, wherein the two predetermined modes comprises a first mode and a second mode, wherein the first mode is selected when the mode switch signal indicating the driving state is received, and the second mode is selected when the mode switch signal indicating the stopped state is received, wherein the first mode is one selected from the phone-answering mode and the suspending mode.

6. The radio telephone system according to claim 1, wherein the detector detects a speed of the vehicle.

7. The radio telephone system according to claim 6, wherein, when the speed of the vehicle is not lower than a predetermined speed, the wireless transmitter transmits the mode switch signal indicating a driving state and, when the speed of the vehicle is lower than the predetermined speed, the wireless transmitter transmits the mode switch signal indicating a stop state.

8. The radio telephone system according to claim 7, wherein the controller selects one of two predetermined modes as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

9. The radio telephone system according to claim 6, wherein the two predetermined modes comprises a first mode and a second mode, wherein the first mode is selected when the mode switch signal indicating the driving state is received, and the second mode is selected when the mode switch signal indicating the stopped state is received, wherein the first mode is one selected from the phone-answering mode and the suspending mode.

10. The radio telephone system according to claim 1, wherein the controller selects one of two predetermined modes as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

11. The radio telephone system according to claim 10, wherein the two predetermined modes comprise a first mode to be selected when the vehicle is in a driving state and a second mode to be selected when the vehicle is in a stopped state, wherein the first mode is one selected from the phone-answering mode and the suspending mode.

12. A radio telephone system for use in a vehicle, comprising:
    an accessory mounted in the vehicle; and
    a radio telephone that is separated from the accessory, wherein the accessory comprises:
        a detector for detecting an operation state of the vehicle;

a wireless transceiver for transmitting a mode switch signal indicating the operation state to the radio telephone and receiving a mode switch completion signal from the radio telephone; and an accessory controller determining whether the mode switch completion signal is received from the radio telephone after the mode switch signal has been transmitted to the radio telephone and stopping the wireless transceiver transmitting the mode switch signal unless the mode switch completion signal is received from the radio telephone, and wherein the radio telephone comprises:

a radio transceiver for telephone communication;

a wireless transceiver for receiving the mode switch signal from the accessory and transmitting the mode switch completion signal to the accessory; and a radio telephone controller for changing an operation mode of the radio telephone depending on the mode switch signal before causing the wireless transceiver to transmit the mode switch completion signal to the accessory.

13. The radio telephone system according to claim 12, wherein the detector detects an on/off state of an ignition key of the vehicle.

14. The radio telephone system according to claim 13, wherein, when the ignition key is in the on state, the wireless transmitter transmits the mode switch signal indicating a driving state and, when the ignition key is in the off state, the wireless transmitter transmits the mode switch signal indicating a stop state.

15. The radio telephone system according to claim 12, wherein the detector detects a speed of the vehicle.

16. The radio telephone system according to claim 15, wherein, when the speed of the vehicle is not lower than a predetermined speed, the wireless transmitter transmits the mode switch signal indicating a driving state and, when the speed of the vehicle is lower than the predetermined speed, the wireless transmitter transmits the mode switch signal indicating a stop state.

17. The radio telephone system according to claim 12, wherein the controller selects one of two predetermined modes as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

18. The radio telephone system according to claim 17, wherein the two predetermined modes comprises a first mode to be selected when the vehicle is in a driving state and a second mode to be selected when the vehicle is in a stopped state, wherein the first mode is one selected from the phone-answering mode and the suspending mode.

19. A method for switching an operation mode of a radio telephone within a vehicle in a radio telephone system comprising an accessory mounted in the vehicle and the radio telephone that is separated from the accessory, said method comprising:

detecting, at the accessory, an operation state of the vehicle;

transmitting, at the accessory, a mode switch signal indicating the operation state to the radio telephone;

receiving, at the radio telephone, the mode switch signal from the accessory; and changing, at the radio telephone and depending on the mode switch signal, an operation mode of the radio telephone.

20. The method according to claim 19, wherein the operation state of the vehicle comprises an on/off state of an ignition key of the vehicle.

21. The method according to claim 20, wherein, when the ignition key is in the on state, the mode switch signal indicating a driving state is transmitted and, when the ignition key is in the off state, the mode switch signal indicating a stop state is transmitted.

22. The method according to claim 19, wherein the operation state of the vehicle comprises a speed of the vehicle.

23. The method according to claim 22, wherein, when the speed of the vehicle is not lower than a predetermined speed, the mode switch signal indicating a driving state is transmitted and, when the speed of the vehicle is lower than the predetermined speed, the mode switch signal indicating a stop state is transmitted.

24. The method according to claim 19, wherein one of two predetermined modes is selected as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

25. The method according to claim 24, wherein the two predetermined modes comprises a first mode to be selected when the vehicle is in a driving state and a second mode to be selected when the vehicle is in a stopped state, wherein the first mode is one selected from the phone-answering mode and the suspending mode.

26. A method for switching an operation mode of a radio telephone within a vehicle in a radio telephone system comprising an accessory mounted in the vehicle and the radio telephone that is separated from the accessory, said method comprising:

detecting, at the accessory, an operation state of the vehicle;

transmitting, at the accessory, a mode switch signal indicating the operation state to the radio telephone;

receiving, at the radio telephone, the mode switch signal from the accessory and transmitting the mode switch completion signal to the accessory;

changing, at the radio telephone and depending on the mode switch signal, an operation mode of the radio telephone;

transmitting, at the radio telephone, a mode switch completion signal to the accessory;

determining, at the accessory, whether the mode switch completion signal is received from the radio telephone; and stopping, at the accessory, transmission of the mode switch signal unless the mode switch completion signal is received from the radio telephone.

27. The method according to claim 26, wherein the operation state of the vehicle comprises an on/off state of an ignition key of the vehicle.

28. The method according to claim 27, wherein, when the ignition key is in the on state, the mode switch signal indicating a driving state is transmitted and, when the ignition key is in the off state, the mode switch signal indicating a stop state is transmitted.

29. The method according to claim 26, wherein the operation state of the vehicle comprises a speed of the vehicle.

30. The method according to claim 29, wherein, when the speed of the vehicle is not lower than a predetermined speed, the mode switch signal indicating a driving state is transmitted and, when the speed of the vehicle is lower than the predetermined speed, the mode switch signal indicating a stop state is transmitted.

31. The method according to claim 26, wherein one of two predetermined modes is selected as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

32. The method according to claim 31, wherein the two predetermined modes comprises a first mode to be selected when the vehicle is in a driving state and a second mode to be selected when the vehicle is in a stopped state, wherein the first mode is one selected from the phone-answering mode and the suspending mode.

33. A radio telephone separated from an accessory mounted in a vehicle, wherein the accessory transmits a mode switch signal to the radio telephone when a change of an operation state of the vehicle is detected, the radio telephone comprising:

a radio transceiver for telephone communication;

a wireless receiver for receiving the mode switch signal from the accessory; and a controller for changing an operation mode of the radio telephone depending on the mode switch signal.

34. The radio telephone according to claim 33 wherein the controller selects one of two predetermined modes as the operation mode of the radio telephone depending on the mode switch signal, wherein the two predetermined modes are selected from a communication mode that makes a normal telephone function active, a phone-answering mode that makes an automatic answering function active, and a suspending mode that makes both the normal telephone function and the automatic answering function inactive.

35. The radio telephone according to claim 34, wherein the two predetermined modes consists of a first mode to be selected when the vehicle is in a driving state and a second mode to be selected when the vehicle is in a stop state, wherein the first mode is one selected from the phone-answering mode and the suspending mode.

36. The radio telephone according to claim 33, wherein the mode switch signal indicates a driving state where the ignition key is in the on state and indicates a stop state where the ignition key is in the off state.

37. The radio telephone according to claim 33, wherein the mode switch signal indicates a driving state where a speed of the vehicle is not lower than a predetermined speed and indicates a stop state where the speed of the vehicle is lower than the predetermined speed.

* * * * *